US008005019B2

(12) United States Patent
Cohen

(10) Patent No.: US 8,005,019 B2
(45) Date of Patent: Aug. 23, 2011

(54) FUZZY ROUTING

(75) Inventor: Alain J. Cohen, Washington, DC (US)

(73) Assignee: OPNET Technologies, Inc., Bethesda, MD (US)

( * ) Notice: Subject to any disclaimer, the term of this patent is extended or adjusted under 35 U.S.C. 154(b) by 1870 days.

(21) Appl. No.: 11/125,562

(22) Filed: May 10, 2005

(65) Prior Publication Data

US 2005/0255848 A1 Nov. 17, 2005

Related U.S. Application Data

(60) Provisional application No. 60/569,858, filed on May 11, 2004.

(51) Int. Cl.
*H04L 12/28* (2006.01)
(52) U.S. Cl. ........ 370/255; 370/349; 370/392; 370/397; 370/475; 709/243; 455/456.1
(58) Field of Classification Search .................. None
See application file for complete search history.

(56) References Cited

U.S. PATENT DOCUMENTS

| 5,883,890 | A * | 3/1999 | Okanoue et al. ............. 370/392 |
| 5,889,770 | A * | 3/1999 | Jokiaho et al. ............... 370/337 |
| 6,104,712 | A * | 8/2000 | Robert et al. ................ 370/389 |
| 6,125,279 | A * | 9/2000 | Hyziak et al. ................ 455/445 |
| 6,185,427 | B1 * | 2/2001 | Krasner et al. ............ 455/456.2 |
| 7,233,782 | B2 * | 6/2007 | Bao et al. .................. 455/404.2 |
| 2001/0027107 | A1 * | 10/2001 | Shinozaki et al. ............ 455/456 |
| 2001/0041576 | A1 * | 11/2001 | I'Anson et al. .............. 455/456 |
| 2002/0019238 | A1 * | 2/2002 | McDonnell et al. .......... 455/456 |
| 2002/0068584 | A1 * | 6/2002 | Gage et al. .................. 455/456 |
| 2002/0184376 | A1 * | 12/2002 | Sternagle .................... 709/230 |
| 2003/0026268 | A1 * | 2/2003 | Navas ........................ 370/389 |
| 2003/0110290 | A1 * | 6/2003 | Hiyama et al. .............. 709/242 |
| 2003/0117966 | A1 * | 6/2003 | Chen .......................... 370/255 |
| 2003/0117988 | A1 * | 6/2003 | Asano et al. ................ 370/338 |
| 2003/0128987 | A1 * | 7/2003 | Mayer ......................... 398/98 |
| 2003/0235173 | A1 * | 12/2003 | Wood ......................... 370/338 |

OTHER PUBLICATIONS

Rao et al., "Geographic Routing without Location Information", 2003, International Conference on Mobile Computing and Networking, Proceedings of the 9th annual international conference on Mobile computing and networking,pp. 96-108.*
Xing et al.,"On Greedy Geographic Routing Algorithms in Sensing-Covering Networks", 2004, International Symposium on Mobile Ad Hoc Networking & Computing, Proceedings of the 5th ACM international symposium on Mobile ad hoc networking and computing, pp. 31-42.*

* cited by examiner

*Primary Examiner* — Kwang B Yao
*Assistant Examiner* — Jeffrey Rutkowski
(74) *Attorney, Agent, or Firm* — Robert M. McDermott, Esq.

(57) ABSTRACT

A system and method optimizes the information flow regarding node location across a network by controlling the propagation of this information based on distance from the node. Location servers that are near to a node receive detailed information regarding the node's location; location servers that are farther from the node receive less detailed information. In like manner, periodic updates are provided less frequently to distant location servers, and preferably also based on the velocity of a mobile node, or on a priority associated with the mobile node. The location information provided in a message addressed to a node can be minimal when the message is transmitted, and additional detail can be added to this location information by routing nodes as the message is routed closer to its destination, based on information provided by the location servers.

18 Claims, 3 Drawing Sheets

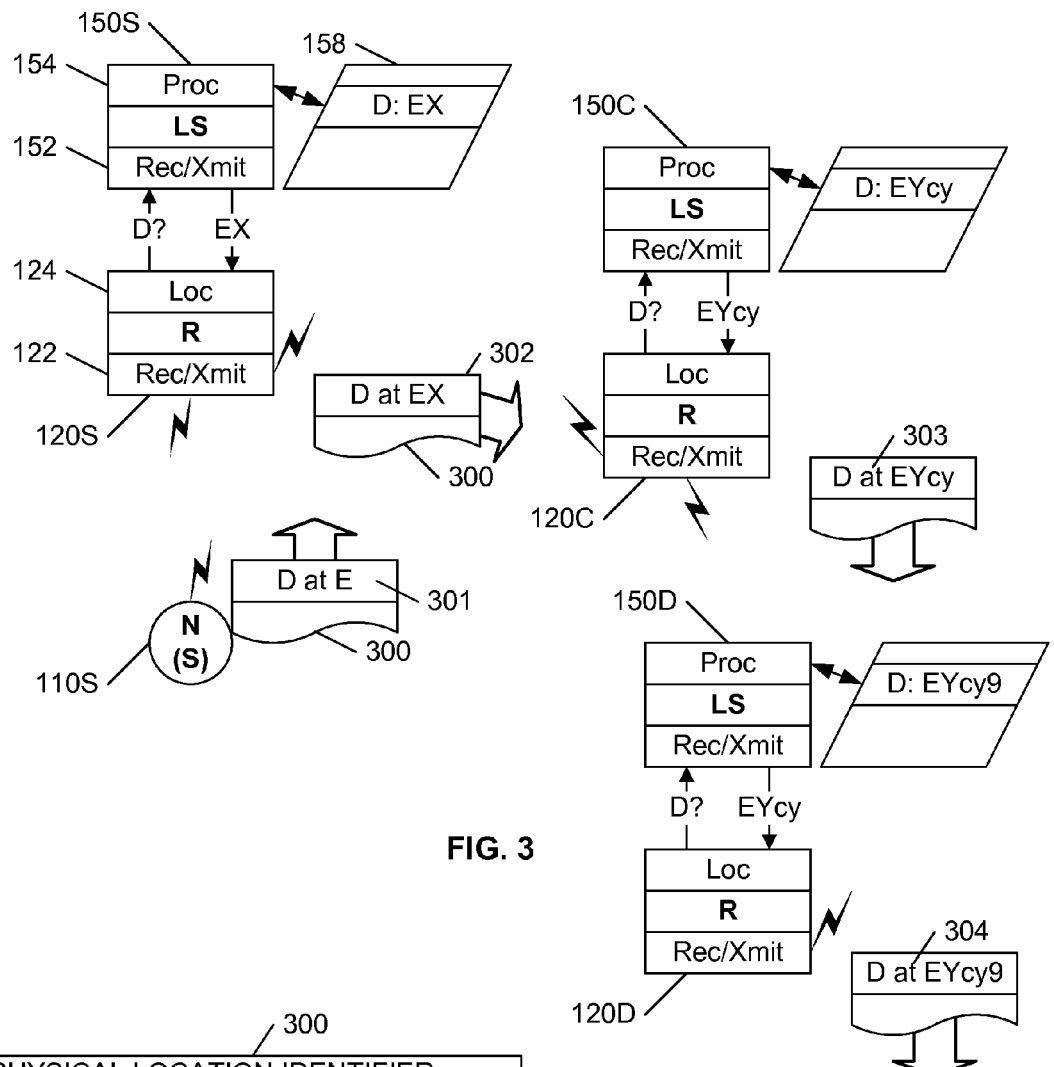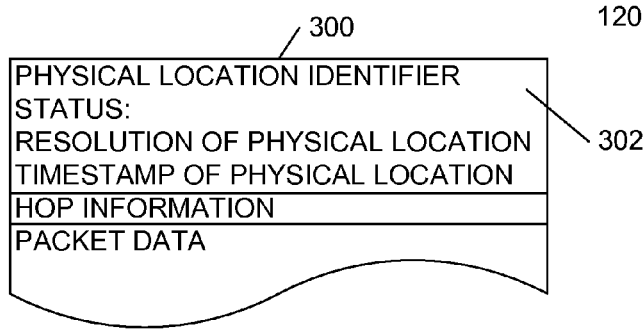

FUZZY ROUTING

This application claims the benefit of U.S. Provisional Patent Application 60/569,858, filed 11 May 2004.

BACKGROUND AND SUMMARY OF THE INVENTION

This invention relates to the field of communication systems, and in particular to a network that includes mobile nodes.

The proliferation of mobile communications, from Internet capable telephones to battlefield computers has placed substantial demand on conventional networks and routing schemes. In prior art fixed networks, it is common for the network topology to be proactively distributed among routers, and each router uses this information to pre-compute routes through the topology. In a "reactive" routing scheme, queries are broadcast to find a route to a node.

The addressing scheme used to identify nodes is often designed in a way as to improve the efficiency of path computations. For example, hierarchical addresses, such as in the Internet Protocol (IP), are used so that paths need only be computed to destination networks and not the actual destination node. In networks with mobile nodes where no particular neighbor relationships can be assumed a priori, commonly termed "ad-hoc" networks, the network topology is constantly changing, and the routers cannot take advantage of pre-computed paths to route packets to a destination node.

Geographic routing has been proposed for use in ad hoc networks. Mobile nodes determine their location via GPS or other location-determining systems and periodically or aperiodically broadcast "Hello" messages in a proactive scheme. Nodes within range of this broadcast update their routing tables with the identification of the node and its current location. This updated location information is further transmitted throughout the network. In a reactive scheme, queries are broadcast, and a mobile node responds to a query for its location.

In a geographic-routing system, the header information associated with each message contains both the addressed node's address and its location. Based on the addressed node's location, receiving nodes progressively forward the message to nodes that are closer to the addressed node's location, until the message arrives at the addressed node.

In many conventional mobile networks, any node that is capable of forwarding messages effectively serves the function of a router. For the purposes of this disclosure, the terms 'node' and 'router' do not necessarily imply different components; that is, a node may perform routing functions, and a router may be a source or a destination of messages.

Of particular note, in an ad-hoc network, or any network with mobile nodes and particularly in networks wherein nodes include routing functions, when a mobile node changes location, substantial overhead is consumed to update the network topology at each node.

In "A SCALABLE LOCATION SERVICE FOR GEOGRAPHIC AD HOC ROUTING", by Jinyang Li et al. (hereinafter Li), MIT Laboratory for Computer Science, Cambridge, Mass., Li discloses a grid-based system that addresses the routing challenges in ad-hoc/mobile networks. In Li's system, the network is partitioned into a hierarchical grid, typically corresponding to a geographic grid. Location servers are distributed throughout the grid, and are accessible to nodes that are in proximity to these servers. Nodes may also serve a dual function of routing and location serving, although fixed location nodes are preferred for location serving.

Within an order-1 square, at the lowest level of the Li's hierarchy, a location server is aware of each node currently within the square. When a location server receives a request for the location of a node that is external to its order-1 square, the location server forwards the message to a location server in an order-2 square. An order-2 square comprises four order-1 squares, the aforementioned order-1 square and three adjacent order-1 squares; an order-3 square comprises 4 order-2 squares, and so on. The location request continues up the hierarchy until the hierarchy includes the addressed node. When the hierarchy level is broad enough to include the addressed node, the addressed node is 'found', and the location server at this level returns the addressed node's last reported location. Using this location, messages are routed to the addressed node using conventional geographic routing.

To reduce the overhead associated with continuously updating each node's location, only one location server at each hierarchy level is used to keep track of a node's current location. To avoid burdening a single location server at each level of the hierarchy with the responsibility of tracking all the nodes within the hierarchy, each node selects its location server at each level of the hierarchy substantially independently of other nodes' choices of their location servers. Thus, at any level of the hierarchy, only one location server receives updated location information from a given node; but, more than one location server at each level of the hierarchy may receive updated location information from more than one node. The algorithm used by each node to select location servers is based on the address/ID of the node, and this same algorithm is used by the other nodes to search for the location server corresponding to a node's address at each level of the hierarchy. The address/ID of each node is based on a hash of the node's name, to provide a fairly uniform distribution of unique IDs.

Although Li's solution provides an efficient means of determining a node's location, it does require the formation of a hierarchical grid system wherein each square at the same order of the hierarchy is unique, and non-overlapping with other squares of the same order. It also assumes that the current location of each node is continually and/or periodically provided to each location server at each level of the hierarchy.

It is an objective of this invention to provide a location updating and reporting service that reduces the amount of overhead typically associated with routing through a network that includes mobile nodes. It is a further objective of this invention to provide a location updating and reporting service that eliminates the need for a sending node to know the precise location of a destination node before sending a message to the destination node.

These objectives, and others, are achieved by a system and method that tends to optimize the information flow regarding node location across a network. Location servers that are near to a node receive detailed information regarding the node's location; location servers that are farther from the node receive less detailed information. In like manner, periodic updates are provided less frequently to distant location servers, and preferably also based on the velocity of a mobile node, or on a priority associated with the mobile node. The location information provided in a message addressed to a node can be minimal when the message is transmitted, and additional detail can be added to this location information by routing nodes as the message is routed closer to its destination, based on information provided by the location servers.

BRIEF DESCRIPTION OF THE DRAWINGS

The invention is explained in further detail, and by way of example, with reference to the accompanying drawings wherein:

FIG. 3 illustrates an example flow of messages in the network of FIG. 2, in accordance with this invention.

FIG. 5 illustrates a sample message with status information associated with a physical location identifier.

Throughout the drawings, the same reference numerals indicate similar or corresponding features or functions. The drawings are included for illustrative purposes and are not intended to limit the scope of the invention.

DETAILED DESCRIPTION OF THE INVENTION

The invention is presented using discrete blocks to represent nodes, routers, and location servers, for ease of understanding. In a typical embodiment of this invention, some or all of these functions may be combined within a single device. Therefore, certain terms, such as "transmit", "receive", and so on, are to be interpreted broadly. For example, when this disclosure, including the claims, states that a router "sends" or "transmits" a request to a location server, one of ordinary skill in the art will recognize that if the router and location server are combined within a single device, this "sending" of the request may be as simple as changing the state of a signal within the device, changing the state of a variable in a computer program, calling a particular subroutine, or any of a variety of other techniques commonly used to communicate among hardware devices or software routines. In like manner, the term "message" is also to be interpreted broadly, to include messages of all types, including data, voice, and video information, signaling and control information, and so on.

Figure 1:
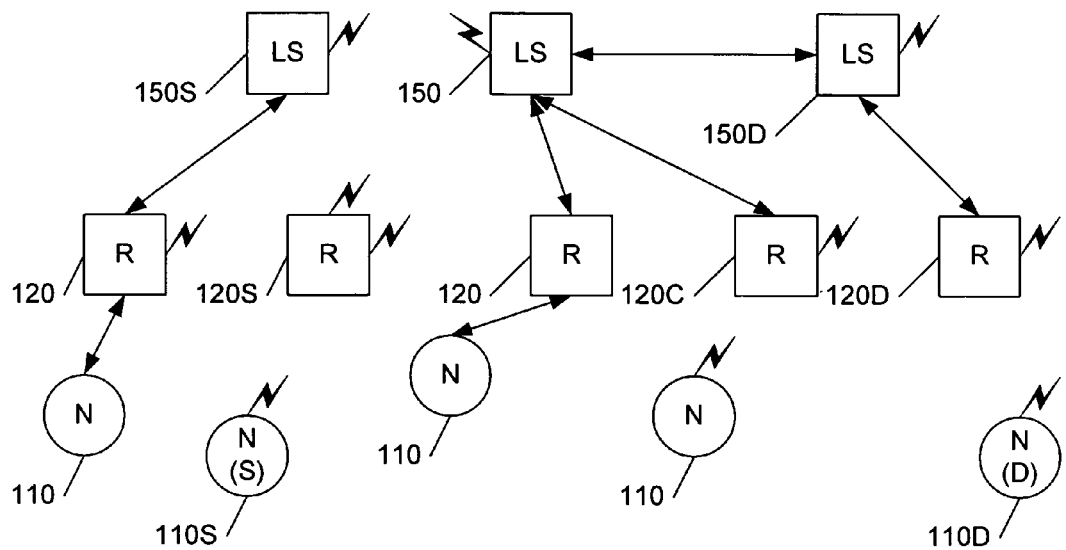
FIG. 1 illustrates an example block diagram of a network in accordance with this invention.

FIG. 1 illustrates an example network comprising nodes 110, routers 120, and location servers 150. As illustrated, these nodes 110, routers 120, and location servers 150 may be configured to communicate using wired (solid arrow symbol) or wireless (lightning bolt symbol) communications. The nodes 110S and 110D identify a source node S and a destination node D, respectively. In accordance with one aspect of this invention, the node 110S sends a message intended for node 110D to a router 120S, using whatever location information the node 110S currently has regarding node 110D.

If the router 120S has sufficient information regarding the current location of node 110D, the router 120S forwards the message on to another router 120C that is closer to node 110D than 120S. If the router 120S does not have sufficient information regarding the current location of node 110D to forward the message, the router 120S contacts a location server 150S, to request the current location of node 110D. The location servers 150 are configured to contain sufficient information to allow a router within its domain to forward a message toward a known node in the network, as discussed further below. If the particular location server 150S does not have sufficient information locally, it contacts other location servers 150 to obtain this information; but in a proactive routing network, the likelihood of having to request information from other location servers is low.

Note that, in contrast to conventional routing schemes, including geographic routing schemes, neither the router 120S nor the location server 150S is required to provide the detailed location information that would be required to route the message all the way to the destination node 110D. The router 120S and location server 150S are only responsible for providing sufficient information to facilitate the forwarding of the message to another router 120 that is likely to be closer to the destination node 110D than the router 120S. That is, the router 120S need only have an approximate, or "fuzzy", notion of where the node 110D is located. As the message is routed closer to the node 110D, each router 120 must also have sufficient information for continuing the message to a router that is closer to node 110D, and thus the degree of approximation, or "fuzziness" is reduced as the message gets closer to the destination node 110D.

The term "precise location" is used hereinafter to indicate location information that is sufficient to reach a router 120D from which a node 110D at that location can be contacted directly. The term "abstract location" is used hereinafter to indicate location information that is insufficient to necessarily reach a router from which a node at that location can be contacted directly. Using a postal analogy, a precise location corresponds to a person's street address, whereas an abstract location might be the person's postal/zip code, or state, or country, etc. The particular levels of abstraction and the required level of precision to locate a node will be dependent upon the particular network, and possibly particular sections of a network. For example, in a private corporate wide-area network, the building number of a person's office may be sufficiently precise location information for communicating directly with a person, regardless of where in the building the person is located. In another corporate network, the floor number of the person's current location may be required, the building number being an abstract location. In public networks, the definition of a precise location may be dependent upon the density of communication towers within an area and/or the density of, for example, "Internet cafes" within another area. In a military network, the definition of a precise location may be dependent upon the current troop deployment, the schedule of aircraft overflights, and so on. The term "assumed location" is used hereinafter to indicate the most recently reported location of a node at a location server, and may be either a precise location or an abstract location.

In Li's system, discussed above, each of the selected location servers for a given node is provided the precise location of the node. When a router searches for the location of a node, the hierarchy is searched until a location server associated with the node is located; once the location server is found, the precise location of the node is provided to the router, thereby avoiding any further searches for the node's location. Offsetting the efficiency provided by Li's system, however, is the requirement that each location server must be continuously updated with the precise location of each of its assigned nodes. Thus, if a node travels from a region covered by one router to a region covered by another router, all of the location servers associated with the node must be updated. Also, if the node performs this travel while the message is in transit, and the routers of Li's system are designed to route the message based on the once-determined precise location, there is a likelihood that the message will arrive at the 'prior' router associated with the node, rather than the currently associated router.

In accordance with this aspect of the invention, because each location server 150 needs only to provide sufficient information to lead the message closer to the destination, location servers 150 that are far from the destination node do not need the precise location of the node. As such, less information needs to be sent to farther location servers.

In accordance with a second aspect of this invention, because the velocity of a mobile node is finite, the rate of updating farther location servers can be substantially less than the rate of updating location servers that are close to the mobile node. Either or both of these aspects of the invention can be incorporated into an embodiment of this invention to reduce the overhead traffic associated with updating the location of mobile nodes. Reducing the amount of information transmitted, and/or the frequency of transmission of the information, reduces the amount of bandwidth consumed in updating the location of mobile nodes.

In an example embodiment of this invention, some or all of the routers 120 along the path of a message between a source and destination are configured to review the location information contained within the message, to determine whether the location information should be updated. This determination can be based on one or more of a variety of factors, including, but not limited to whether the location information in the message is sufficient to continue the routing of the message toward the destination, and whether the location information in the message is recent enough to provide a reliable determination of the routing required to continue the message toward the destination. Each of these factors is preferably dependent upon the distance between the router and the assumed location of the destination node. That is, a router that is far from a destination node may rely on more abstract and/or less timely location information than a router that is in close proximity to the assumed location. Other parameters, such as the number of hops (transmissions between routers) since the last update, distance traveled since the last update, previously reported velocity of the destination node, priorities associated with the message and/or the source or destination nodes, the current route of the message, and so on, may also, or alternatively, be used to affect the determination of whether the location information should be updated. In lieu of specific criteria being used for each parameter to determine whether the location information should be updated, a composite "score" based on the individual parameters may be determined, and the determination of whether to update the location information can be based on this score.

Note that the criteria used to determine whether to update the location information need not be limited to parameters associated with the available location information or the routing path. For example, if spare resources are available at a router, the router may routinely or randomly update its locally stored location information, in response to receipt of a message, or in anticipation of future traffic requirements. Similarly, the choice of updating the location information may be based on the quantity of data that is being communicated to a given node, so that large packets, or numerous packets, addressed to the given node are most efficiently communicated through the network. These and other criteria and techniques for determining whether to update the location information will be evident to one of ordinary skill in the art in view of this disclosure.

When a router 120 determines that the location information in a message should be updated, it contacts a location server 150 to obtain the updated information. Preferably, as discussed further below, the process used to forward location information from a node 110 to the location servers 150 is consistent with the process used to determine whether updated information should be obtained, so that when a router 120 requests updated information, the appropriate information is available at the location server 150. That is, for example, if a router at a certain distance from a node is configured to request updated location information whenever the information in the message is over T minutes old, the process used to forward location information from the node to the location server that serves routers at this distance preferably updates the location server at least every T minutes. In this manner, the information from the location server is known to be more recent than the information in the message. In like manner, if the router determines that the location information in the message is too abstract at this distance from the destination node, the process used to forward location information to the location server is preferably configured to provide at least a less abstract level of location information. Upon receipt of the updated location information, the router 120 replaces the location information in the message with this updated information, and forwards the message to a next router 120 that is closer to the destination node, based on this updated information.

Figure 2:
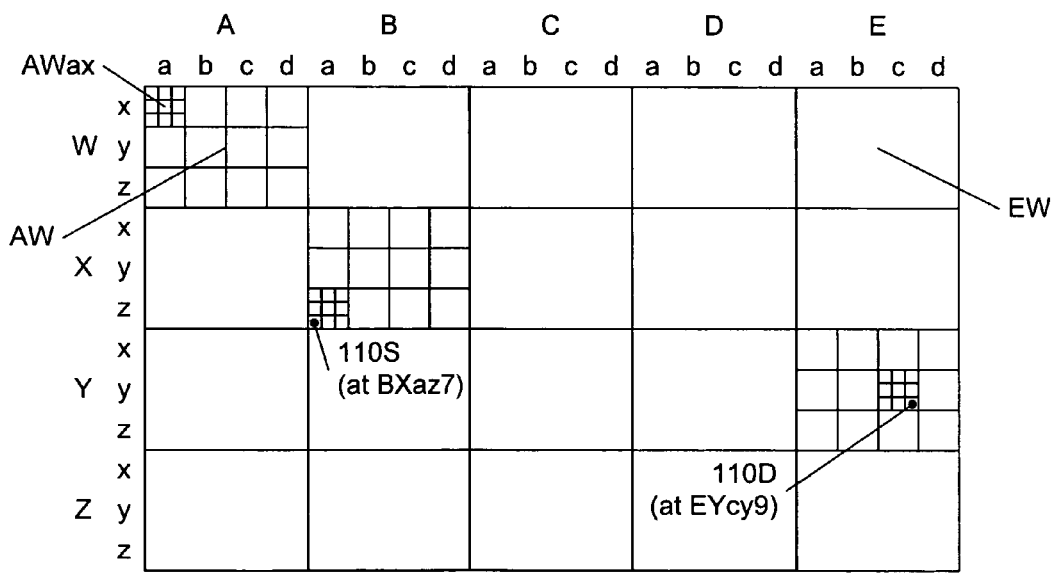
FIG. 2 illustrates an example grid-based network in accordance with this invention.

FIG. 2 illustrates an example hierarchical grid-based network in accordance with an example embodiment of this invention. In this example grid, a node's location designator is a concatenation of the designators of each grid in the hierarchy. For example, all nodes in the larger upper-left block of the network have a location designator that begins with AW; all nodes in the larger upper-right block have an location designator that begins with EW; and so on. Within the larger block are twelve smaller boxes, which are designated by one of the lower case letters a-d followed by one of the lower case letters x-z. Thus, all the nodes in the upper-left smaller block within the upper-left larger block have location designators that begin with AWax. Within each smaller block are nine smaller blocks, which are sequentially numbered, left-to-right, top-to-bottom by the numbers 1-9. Thus, the precise location of the illustrated destination node 110D in FIG. 2 is EYcy9, and the precise location of the source node 110S is BXaz7.

Note that this grid-based location system is only an example, and any of a variety of other location-designation systems could be used. Example conventional location-designation systems include latitude-longitude systems, street-city-state-country system, and so on. An unconventional location-designation system could be a color-coding, with largest regions being defined by the primary colors, and more precisely defined regions being defined by shades and blends of these colors; for example, a node in an "orange" region is somewhere between the centers of the red and yellow regions, and so on.

Also note that "location" and "distance" as used herein are related to locations within a network, and need not be directly related to geographic location and/or geographic distance. Often, a network topology comprises a mix of geographic-related locations and logically-related locations. For example, in a corporate network, the network topology may include "east-coast offices", "west-coast offices", and "international offices", the international offices being reached from a common router, regardless of the particular geographic location of each office. If an employee is known to be visiting overseas offices, the abstract location designator may merely be "international offices", regardless of whether the person is visiting offices in Japan or offices in England. In like manner, certain corporate buildings may be linked more directly to each other, based on the functions performed at these buildings, than other, perhaps less important, corporate buildings, regardless of geographic location.

FIG. 3 illustrates an example routing of a message 300 from the source node 110S to the destination node D, 110D, using the example grid-based routing system of FIG. 2.

In this example, the source node 110S is only aware that the node D was in the general area of E in the grid of FIG. 2, and sends the message 300 with this location information 301 to the router 120S. Each router 120 includes one or more receiver/transmitters 122, which may be wired or wireless, or a combination of both, for receiving messages from nodes within its area, and a locator 124 that is configured to determine whether the location information within each message needs updating, and if so, requests the information from an information server 150. In the example of FIG. 3, the locator 124 of router 120S determines that the location information 301 in the message 300 needs updating, either because it is too abstract, or too old, and requests an update from the location server 150S. Depending upon the particular network, this request may be communicated via the receiver/transmitter 122, or via a different receiver/transmitter system.

Each location server 150 includes a receiver/transmitter 152 for receiving location requests from routers 120 within its area of responsibility, and a processor 154 that is configured to provide the assumed location of the requested node, typically via a database 158. In this example, the most recent information in the database 158 at the server 150S indicates that node D is located in block EX of the grid of FIG. 2. As detailed below, and as illustrated in FIG. 2, this location information is incorrect, because node D is currently located in block EY of FIG. 2. In this example, the server 150S is far from node D, and in accordance with one aspect of this invention, does not receive frequent updates of node D's location. However, the information provided by the server 150S is sufficient for the router 120S to determine a routing path that will bring the message 300 closer to node D.

Upon receipt of the updated, albeit incorrect, location information from the server 150S, the router 120S updates the message 300 with the location information 302 from the server 150S and transmits the updated message 300 to another router 120. The transmission process includes both a choice of the next router 120 and the communication of the message to the chosen next router 120. The choice of the next router 120 is based on conventional routing principles, commonly known to those skilled in the art. In a straightforward embodiment, the router 120S selects the next router 120 based on a distance-minimization algorithm, wherein a shortest path from server 120S to node D's location is determined, and the message is forwarded to the first router on this path. Other criteria may be used in lieu of or in conjunction with, this distance-minimization algorithm to select among available routers, such as the number, type, or capacity of the neighbors of each router, the availability of location servers at each router, the freshness and/or quantity of data at a location database associated with each router, and so on.

The router 120S may also update the 'status' of the location information 302. For example, if the system is configured to determine whether an update is required based on the age of the location information in each message, the server 150S provides the time that the destination node provided this location information, and the router 120S includes this time in the updated location information 302 that is communicated to the next router 120. In like manner, if the system is configured to determine whether an update is required based on other parameters, such as the number of hops since the last update, or the path of the message thus far, the status of the information 302 is updated to reflect these parameters. As would be evident to one skilled in the art, updating of the status of the message and/or location information at each router 120, such as updating a count of hops since the last information update, can be independent of whether the location information is also updated at the router.

A sample message 300 with the aforementioned status information is illustrated in FIG. 5.

In the example of FIG. 3, the message 300 with updated location information 302 is communicated from the router 120S to a router 120C, perhaps via additional routers (not illustrated) in the path between routers 120S and 120C. The router 120C determines that an update to the location is required, either because the location (EX) is too abstract, or the time associated with the location is too far in the past, and contacts a location server 150C for a more current or more precise location. The information at the location server 150C indicates that the assumed location of node D is at block EYcy in FIG. 2, and this information is communicated to the router 120C. Presumably, this information is more recent and/or more precise than the information that was available at the router 120S via the location server 150S, because the router 120C and server 150C are closer to the node D.

The router 120C updates the message with this updated location information 303, and optionally with the time that the node D provided this updated location information, and forwards the message to another router 120 that is closer to node D.

When the message is received at router 120D, router 120D requests a current location for node D from server 150D. In this example, the server 150D notifies router 120D that the current location of node D is block EYcy9, which is in the service range of router 120D, and router 120D forwards the message directly to node D, 110D in FIG. 3. If the reported block were not in range of router 120D, router 120D would have forwarded the message to a router 120 that was closer to node D.

Note that the example routing of FIG. 3 did not require any location server 150 other than the last server 150D to have the precise location of the node D, and even allowed for one or more of the servers 150 to have incorrect location information. Note also that in an embodiment that uses the age of the location information as criteria for updating, the order of abstraction need not be strict. That is, for example, the node 110S may have had precise, but old, location information regarding node D, and may have included it in the location information 302. But, as soon as one of the routers 120S, 120C, 120D detected that the location information was too old to be reliable, an updated location would be obtained from the corresponding server 150, and this updated location, at whatever abstraction level from the server 150, would replace the precise location information originally provided. In like manner, the age-related criteria will also compensate for mis-routings that may be caused by a fast moving node.

It is significant to note that the abstract, or fuzzy, routing technique presented above can be incorporated in other conventional routing schemes. For example, the principles of this invention can be incorporated in the geographic routing system of Li, discussed above, to reduce the overhead associated with updating Li's location servers. In such a combined embodiment, the propagation of a node's precise location would be limited, by the amount of information communicated and/or by the frequency of the location updates, or both, based on the hierarchical position of each of the selected location servers for each node. In a straightforward embodiment, the order-1 server may receive each update from the node; the order-2 server may receive every-other update; the order-3 server every fourth update; and so on. In accordance with the principles of this invention, instead of relying on the location information provided by the first order-j server of Li that has location information corresponding to a destination node, the lower-order servers are accessed as the message is propagated, to obtain more current or more precise information as the message gets closer to the destination. Similarly, one of ordinary skill in the art will recognize applications of the fuzzy routing techniques of this invention to other routing schemes, based on this disclosure. In like manner, one of ordinary skill in the art will recognize that an embodiment of this invention may include the ancillary techniques of other routing schemes, such as backtracking and other techniques used to avoid 'dead-ends' and 'loops'.

Figure 4:
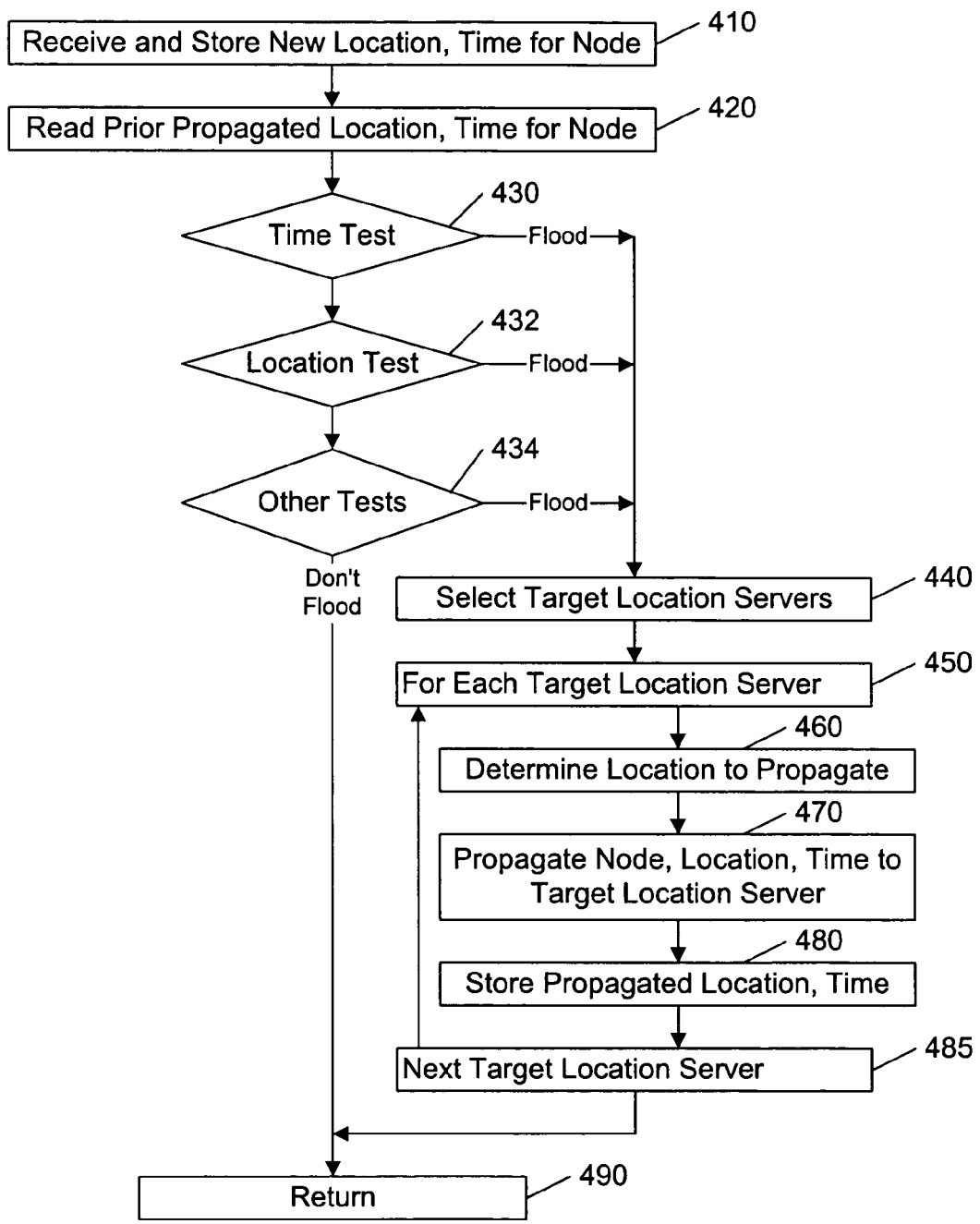
FIG. 4 illustrates an example flow diagram for updating location information associated with a node in accordance with this invention.

FIG. 4 illustrates a flow diagram for processing a node's location within a location server and propagating the location to other location servers (also known as "flooding" the network with the node's location). In this invention, there are two aspects related to flooding: determining whether to update the location of a node, and determining the extent, or range, of the updating process. For ease of presentation and understanding, these two aspects are addressed substantially independently in the flow diagram of FIG. 4, although one of ordinary skill in the art will recognize that a joint/coincident determination could be used.

At 410, the new location of the node, and, optionally, the time associated with this new location, is received and stored at the location server. This information may be received at the location server directly from the node, or from a neighboring router of the node, or from another location server. If the information is received from the node or the currently-neighboring router, the location information will be the precise location of the node; otherwise, it may be an abstract location, as discussed further below.

Preferably, nodes in the network are configured to report their location periodically, or upon traveling a given distance, whichever occurs first. Other criteria for reporting a node's location may be used, including, for example, whether the node has crossed a zone boundary, the amount of traffic being received by the node, and so on. If multiple parameters are used to determine whether to update a node's location, a composite 'score' may be determined based on the multiple parameters, the node's location being updated when this score exceeds a given threshold. The scoring and/or the threshold may be specific to each node in a network, or applicable to all the nodes of the network, or some combination of the two. A combination of proactive and reactive location-update schemes may also be used, wherein, for example, location servers prompt for location-updates from nodes that haven't recently updated their location. A random/stochastic process may also be used to routinely trigger a location update, with or without regard to other location-update criteria.

Although in a typical embodiment, the node will contain location-determining and location-reporting capabilities, other techniques for reporting a node's location may be used. For example, a node without location-determining capabilities may announce its presence in a region with a broadcast message. If a router receives this message, the router can define the node's location as being "within one hop of my location", which sufficiently defines the nodes' "precise location" as defined above. That is, for example, with regard to FIG. 2, a router within zone EYcy9 that receives the node's "hello" message and establishes communication with the node can report the node's precise location as EYcy9, because a message that is routed to EYcy9 will be forwarded directly from this router to the node. In like manner, other location-determining components, such as an RF location-determining system, could be used to provide the location of a node.

Having stored the latest location for the node at the location server, a determination is made as to whether to propagate the location to other location servers. At 420, the location and/or time of the previous propagation/flooding for this node is retrieved from memory, as well as any other information, that is used to facilitate the determination, as discussed further below. The specific tests disclosed herein are provided as examples, and are not intended to limit the scope of this invention, either inclusively or exclusively. Note also that some location servers in the system may be configured to execute more, fewer, or different tests than other location servers, and some servers may be configured to always propagate the new location to other/farther location servers.

At 430, the time since the last flooding is used to determine whether the information at the other/farther location servers is beyond a 'staleness' threshold. At 432, the location of the node is compared to the previously propagated location, to determine whether the information at the other/farther location servers is still accurate. At 434, other parameters may be processed/compared to determine whether the new location needs to be propagated to the other/farther servers. For example, the determination may be based on a status of the particular node, which may include a priority parameter associated with the node, a determined velocity of the node, whether the node has crossed a zone boundary, the amount of capacity/bandwidth the node is expected to require, and so on. Some or all of these parameters may be specified by the node or the router and/or determined by the first location server that receives the new location, and subsequently transmitted with the location information that is forwarded to each farther location server. Additionally, the determination may be based on parameters that are not specific to the node, such as a current level of network traffic congestion, a performance parameter related to prior mis-routed messages, and so on. In general, each of the tests 430-434 are specific to each node, or at least specific to nodes at a common distance from the location server. That is, for example, the staleness and/or distance thresholds at 430-432 are preferably based on how far the location server is from the latest reported location of the node. If the location server is far from the node, these thresholds can be larger than those at location servers that are closer to the node.

Note that although the tests are illustrated as being separate and independent, for ease of understanding, one of ordinary skill in the art will recognize that the tests may be more complex and/or interrelated. For example, the priority of a node may determine the threshold time or distance used in the tests of 430-432. In like manner, the tests 430-432 may be serial, such that both the time and distance thresholds must be exceeded, or a combination of thresholds must be exceeded, to propagate the new location to the other location servers.

If the tests 430-434 determine that the new location is to be propagated to other location servers, a determination is made regarding which other location servers need to be provided with updated location information, at 440. The new information may be communicated on the network that includes the node, or a separate location-server network may be provided for propagating this information.

Generally, the determination at 440 of which location-servers are targets for receiving the node's location information will be based on the new location of the node, or the time since the location of this node was last reported, as well as the structure of the network used to update the location servers. If each location server can communicate only with neighboring location servers, a simple time or location thresholding may be used as a simple "all or none" determination. If, on the other hand, the network is structured such that each location server can communicate with every other location server, different criteria will generally be applied to each location server, or each group of location servers, based generally on the distance of the location servers from the node whose location is being propagated.

As noted above, the determination of which location servers to target for receiving the node's location may be integral with the time and location tests 430, 432, for efficiency processing. In like manner, the tests 430-434 may be configured to set one or more "flooding parameters" that control the extent, or range, of the propagation of the new location, based on the criteria used to determine whether or not to commence such flooding. This flooding parameter may be as simple as a "small" or "large" flood determination, wherein small implies propagation to only adjacent/neighboring location servers, and "large" implies propagation throughout the network. Optionally, such a flooding parameter may be a measure that further refines the extent of the propagation, the level of abstraction of the location provided to distant servers, and so on.

Other criteria for targeting location servers to receive new location information may also be used. For example, if some or all of the location servers are also mobile, the current location, or the amount of movement, of each location server will likely be a factor in determining whether to target that location server.

The loop 450-485 illustrates the propagation the node's location to each of the identified/target location servers. The location that is to be propagated to each location server is determined, at 460. As noted above, in accordance with one aspect of this invention, the precise location of a node need not be propagated to location servers that are far from the node. As such, the location that is propagated to the target location server may be an abstract location that is based on the latest reported location and the distance of the node from the target location server. At 470, the determined location and the time associated with this location are forwarded to the next-farther location servers, and at 480, this forwarded information is stored, for use in determining whether a subsequent location of the node needs to be reported to this location server.

One of ordinary skill in the art will recognize that the flow diagram of FIG. 4 illustrates only one of any number of schemes that can be used to propagate new location information, in either precise or abstract form, to location servers of this invention. For example, as noted previously, the network of this invention will generally be defined in terms of "zones", and the propagation of location information can be made dependent primarily upon zone-crossings. That is, in a straightforward embodiment of this invention, the flooding can be contained by only reporting each zone-crossing event to the location servers in the neighboring zones. Other zone-crossing rules for minimizing the overhead associated with flooding will be evident to those skilled in the art. Using the example location-designation scheme of FIG. 2, for example, the extent of propagation of a node's location can be based on the extent of the change of location-designation between a node's prior reported location and its newly reported location.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the above examples illustrate a proactive routing system, wherein updated locations are provided to the location servers regardless of a demand for this information. In a passive routing system, the location servers are configured to request the location information when prompted by a router, upon receipt of a message; in a passive embodiment of this invention, the location server and/or the router need only request sufficient information to allow the message to be forwarded to a closer router, and/or the information need only be requested if the prior location information is considered stale. Each of these determinations would preferably be based on the distance of the destination node from the requesting router. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements.

I claim:
1. A router comprising:
a receiver that is configured to receive a message having a destination ID and a destination physical location indicator,
a locator that is configured to:
  determine an updated physical location indicator corresponding to the destination ID, and
  update the destination physical location indicator in the message with the updated physical location indicator, and
a transmitter that is configured to transmit the message, based on the updated physical location indicator in the message
wherein the locator is further configured to determine the updated physical location indicator and update the destination physical location indicator based on a status of the destination physical location indicator in the message, the status being included in the message.

2. The router of claim 1, wherein the status of the destination physical location indicator in the message includes: a resolution associated with the destination physical location indicator, a time associated with the destination physical location indicator, and a number of transmissions of the message by other routers.

3. The router of claim 1, wherein the locator is further configured to update the status of the destination physical location indicator when it updates the destination physical location indicator in the message.

4. The router of claim 1, wherein the router is configured to: store the updated physical location indicator corresponding to the destination ID, and update the destination physical location indicator in other messages that are addressed to the destination ID with the stored updated physical location indicator.

5. The router of claim 1, further including a location server that is configured to: receive the updated physical location indicator corresponding to the destination ID, store the updated physical location indicator corresponding to the destination ID, and provide the updated physical location indicator to the locator upon request.

6. The router of claim 5, wherein the location server is further configured to forward an abstract physical location indicator corresponding to the destination ID to at least one other location server.

7. The router of claim 1, wherein the transmitter is further configured to transmit the message based on a route followed by the message thus far.

8. The router of claim 1, wherein the transmitter is further configured to transmit the message based on characteristics associated with one or more other routers along a path to the destination physical location indicator.

9. The router of claim 8, wherein the characteristics associated with each other router of the one or more other routers include one or more of: a location of the other router, neighbors of the other router, location servers associated with the other router, and a location database associated with the other router.

10. A method of routing, comprising:
receiving a message having a destination ID and a destination physical location indicator,
determining an updated physical location indicator corresponding to the destination ID, and
updating the destination physical location indicator in the message with the updated physical location indicator, and
transmitting the message, based on the updated physical location indicator in the message
wherein determining and updating the updated physical location indicator is based on a status of the destination physical location indicator in the message, the status being included in the message.

11. The method of claim 10, wherein the status of the destination physical location indicator in the message includes a resolution associated with the destination physical location indicator, a time associated with the destination physical location indicator, and a number of transmissions of the message by other routers.

12. The method of claim 10, wherein updating the destination physical location indicator in the message includes updating the status of the destination physical location indicator.

13. The method of claim 10, including: storing the updated physical location indicator information corresponding to the destination ID, and updating the destination physical location indicator in other messages that are addressed to the destination ID with the updated physical location indicator.

14. The method of claim 10, including: receiving the updated physical location indicator corresponding to the destination ID, and storing the updated physical location indicator corresponding to the destination ID.

15. The method of claim 14, including forwarding an abstract physical location indicator corresponding to the destination ID to a node in a network.

16. The method of claim 10, wherein transmitting the message is based on a route followed by the message thus far.

17. The method of claim 10, wherein transmitting the message is based on characteristics associated with one or more routers along a path to the destination physical location indicator.

18. The method of claim 17, wherein the characteristics associated with each router of the one or more routers include one or more of: a location of the router, neighbors of the router, location servers associated with the router, and a location database associated with the router.

* * * * *